United States Patent [19]
Cantwell et al.

[11] Patent Number: 5,091,729
[45] Date of Patent: Feb. 25, 1992

[54] ADAPTIVE THRESHOLD DETECTOR

[75] Inventors: Thomas C. Cantwell, Yorba Linda; Richard D. Wilmot, Buena Park, both of Calif.

[73] Assignee: Hughes Aircraft Company, Los Angeles, Calif.

[21] Appl. No.: 300,641

[22] Filed: Dec. 23, 1988

[51] Int. Cl.$^5$ .......................... G01S 13/56; G01S 7/34
[52] U.S. Cl. .......................................... 342/90; 342/91
[58] Field of Search ............ 342/90, 93, 94, 96, 342/91, 159, 197

[56] References Cited

U.S. PATENT DOCUMENTS

| | | | |
|---|---|---|---|
| 3,868,685 | 3/1975 | Wilmot | 342/90 |
| 3,878,530 | 4/1975 | Wilmot | 342/90 |
| 3,940,762 | 2/1976 | Ethington et al. | 342/90 |
| 4,005,415 | 1/1977 | Kossiakoff et al. | 342/90 |
| 4,044,352 | 8/1977 | Wilmot | 342/89 |
| 4,062,012 | 12/1977 | Colbert et al. | 342/90 |
| 4,067,013 | 1/1978 | Smith | 342/91 |
| 4,068,231 | 1/1978 | Wilmot | 342/90 |
| 4,074,264 | 2/1978 | Wilmont | 342/90 |
| 4,093,948 | 6/1978 | Long, III | 342/93 |
| 4,122,450 | 10/1978 | Kowalski et al. | 342/91 |
| 4,151,523 | 4/1979 | Platt et al. | 342/90 |
| 4,213,127 | 7/1980 | Cole | 342/93 |
| 4,274,095 | 6/1981 | Phipps et al. | 342/93 |
| 4,360,811 | 11/1982 | Cantwell, Jr. et al. | 342/93 |
| 4,439,765 | 3/1984 | Wilmot | 342/58 |
| 4,636,793 | 1/1987 | D'Addio et al. | 342/162 |
| 4,713,664 | 12/1987 | Taylor, Jr. | 342/91 |
| 4,963,888 | 10/1990 | Taylor, Jr. et al. | 342/90 |
| 4,965,585 | 10/1990 | Lepere et al. | 342/160 |
| 4,970,660 | 11/1990 | Marchant | 364/517 |

Primary Examiner—John B. Sotomayor
Attorney, Agent, or Firm—Wanda K. Denson-Low

[57] ABSTRACT

An adaptive pulse signal threshold detector is disclosed wherein detected signals are analyzed to determine the strength of the signals and the system is adapted for increased or decreased sensitivity on the basis of the detected signal strength. The adaptive pulse signal threshold detector subjects the detected signals to three threshold criteria during a signal validity analysis. The adaptive pulse signal threshold detector causes the system to be adaptive in so far as the system responds to detected signal strength to alter the detection criteria. The adaptive pulse signal threshold detector includes a binary detector.

15 Claims, 3 Drawing Sheets

ADAPTIVE THRESHOLD DETECTOR

BACKGROUND OF THE INVENTION

1. Field of the Invention

The present invention relates to an apparatus and a method for determining the validity of reflected pulse signals such as sonar and radar signals and in particular to a device and method which use binary threshold detection in combination with a third threshold to distinguish between strong and weak signal returns and to adapt the system or method detection criteria accordingly.

2. Description of the Prior Art

Various devices and methods have been devised to increase the ability of radar and sonar systems to accurately detect a valid reflected pulse signal. These include such devices as comb filters, statistical filters, threshold circuits and the like. In each instance the objective is to distinguish a valid reflected signal from unwanted or invalid signals including background noise, interference from other friendly systems, and jamming signals, while simultaneously insuring that weak but valid signals are not rejected. in a real world environment, valid signals, noise, and interferance signals will range from weak to strong.

Various devices and/or methods have been devised to increase detection of weak valid signals while simultaneously increasing rejection of invalid signals from sources such as background noise, clutter, and jamming devices. One such device is the binary detector or double thresholder. In this device, a received signal is initially envelope detected. The pulse envelopes are first tested against an amplitude threshold. If the signal amplitudes are less than the predetermined amplitude threshold value they are rejected. If the signal amplitudes occurring at a sampling instant are above the threshold value they are counted and the number of pulse envelopes is compared against a second threshold which is a predetermined number of pulse envelopes or zero crossings that occur out of a maximum number of such zero crossings that can occur. If the number of pulse envelopes equals or exceeds the second threshold, a valid detection is established and the signal is output to a tracker or other device. This method of detection increases rejection of randomly arriving impulse interference caused by other nearby systems or from jamming devices inasmuch as the time coincidence of such interference signals with a valid incoherent pulse train reflection is small. A detailed discussion of such a detection device and method is presented in the text "Radar Detection" by J. V. DiFranco and W. L. Rubin and published by Prentice Hall.

In such prior art devices and methods, however, the dichotomy of increasing system sensitivity to ensure detection of all valid signals, including weak signals, with an attendant increase in detection of false or invalid signals versus increasing system selectivity to reduce false detection with an attendant loss of sensitivity and detection of weak signals, persists. There therefor exists a need to provide a system and method for the detection of reflected pulse signals which provides increased sensitivity while simultaneously preserving or increasing system selectivity.

SUMMARY OF THE INVENTION

Broadly, the present invention is an adaptive thresholder and method wherein detected signals are analyzed to determine the strength of the signals and the system and method are then adapted for increased or decreased sensitivity on the basis of detected signal strength. The apparatus and method may be characterized as triple threshold in the sense that a signal is subjected to up to three threshold criteria during the signal validity analysis. The system and method are also adaptive inasmuch as they respond to detected signal strength to alter the detection criteria.

Broadly, the apparatus of the invention comprises a binary detector which includes a signal quantizer which outputs a first signal in response to each received signal that exceeds a predetermined magnitude threshold, and signal gate means connected to receive and count the first signals and output a second signal when the number of first signals exceeds a predetermined second threshold. A sensitivity threshold means is provided which generates the integrated sum of the received signal envelope and outputs a third signal when the value of the integrated sum exceeds a predetermined third threshold but is less than a predetermined multiple of said third threshold. Means are provided to output a valid detection signal in response to either the simultaneous occurrence said first and second signals and said first and third signals.

It is therefore an object of the invention to provide an adaptive threshold detector and method for use in reflected signal detection systems such as radar and sonar systems.

It is another object of the invention to provide such a system and method which adapts the system's detection criteria based upon determination of whether a weak or strong signal is being received.

Still another object of the invention is to provide such a system and method which adaptively uses three threshold criteria to detect weak and strong valid signals.

Yet another object of the invention is to provide a system and method which uses an integration sum of the detected signal envelope as a detection criteria to distinguish between weak and strong signals and to adjust the systems detection criteria accordingly.

BRIEF DESCRIPTION OF THE DRAWINGS

These and other objects of the invention will be better understood in view of the following detailed description of the invention taken in conjunction with the appended drawings, wherein.

DESCRIPTION OF THE PREFERRED EMBODIMENT

Figure 1:
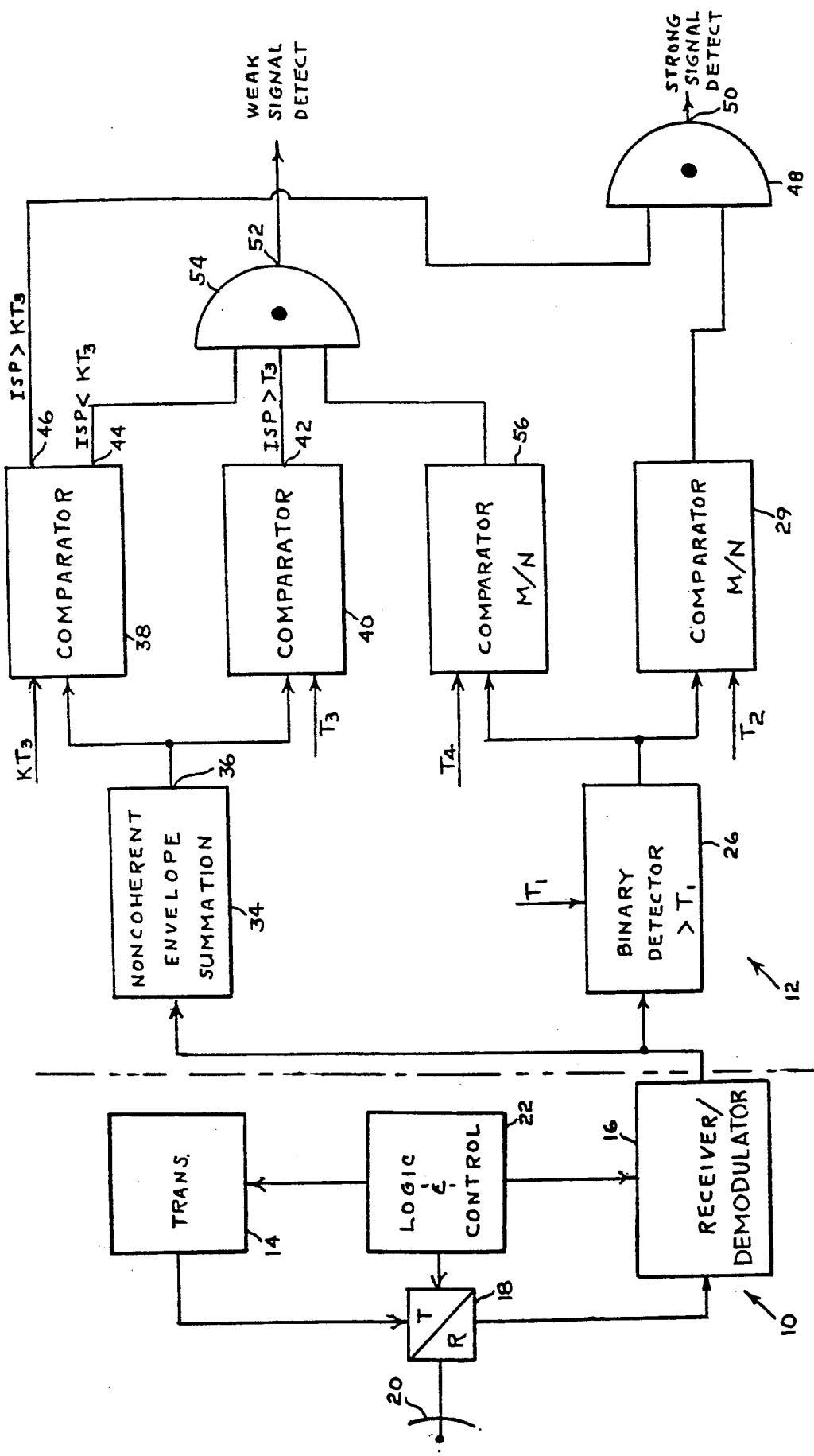
FIG. 1 is a block diagram of the adaptive threshold detector of the present invention.
Figure 4:
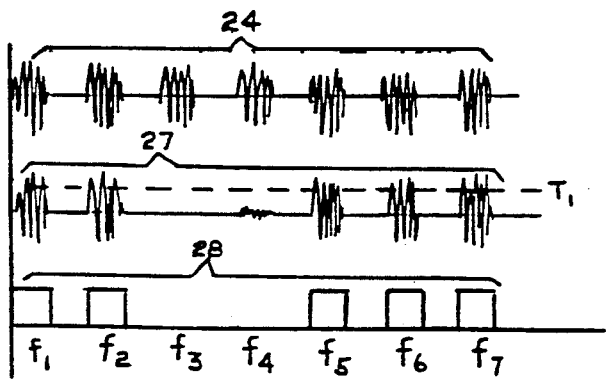
FIG. 4 is a signal diagram also useful in explaining the detection criteria of the invention.

Referring first to FIG. 1 there is shown a typical sonar system 10 in highly simplified form in conjunction with an adaptive threshold detector 12 in accordance with the invention. The system 10 includes a transmitter 14 and receiver/demodulator 16 alternately connected to a transducer 20 through a duplexor or transmit/receive switch 18. Timing and control of the transmitting and receiving function is controlled by a known means herein shown as frequency/logic control 22. In current applications these components are highly sophisticated but well known to those skilled in the art and are shown here only for completeness. Referring to FIG. 4, a typical frequency hopped sonar transmission is shown to comprise a sequence of seven acoustic bursts or chips 20 24, each of the bursts 24 being at one of seven different frequencies $f_1$ through $f_7$. A target having high acoustic visibility will reflect most if not all of the seven chips. Various phenomena such as for example thermal inversions, turbulence, or target characteristics can cause some of the transmitted signals to be lost or absorbed. Similar phenomena and false targets such as waves or other scatterers can reflect one or more of the chips 24. Since the acoustic-reflectivity/absorption of the signals by targets and false targets tends to be frequency dependent, reflection by such is frequency dependant and the false detections will normally occur at some but not all frequencies. Similarly, jamming signals generated by a jamming source will typically occur at some but not all of the chip frequencies $f_1$, through $f_7$.

Referring to both FIGS. 1 and 4, reflected signals 27 are binary envelope demodulated in a binary amplitude threshold detector 26. In this demodulation step, a binary pulse or first validation signal 27 such as pulse 28, FIG. 4B, is generated if a detected chip has a magnitude that exceeds a predetermined amplitude threshold value $T_1$. If a detected reflected signal 27 has a magnitude less than the predetermined threshold $T_1$, no pulse 28 is generated. This is illustrated graphically in FIG. 4 where received reflected signals are shown in conjunction with threshold $T_1$. Referring to FIG's 3 and 4, transducer 20 transmits the sequence of chips 24 at a transmission angle $\theta$, each chip 24 being at one of the seven frequencies $f_1$ through $f_7$. If the transducer is sweeping, each of the seven chips 24 will be transmitted at a different angle as illustrated. In actual practice the transmission time is very short in comparison to sweep velocity and all of the chips 24 may be assumed to be transmitted at a single angle $\theta$. A number of reflections will be detected at different ranges (r) and at various ones of the different frequencies $f_1$-$f_7$, each such reflection being indicated as an "x" in the transmission grid 30. These reflections can be the result of false targets, jamming signals or a valid target 32. A high visibility target 32 can produce up to seven detections, this being the case illustrated.

Figure 3:
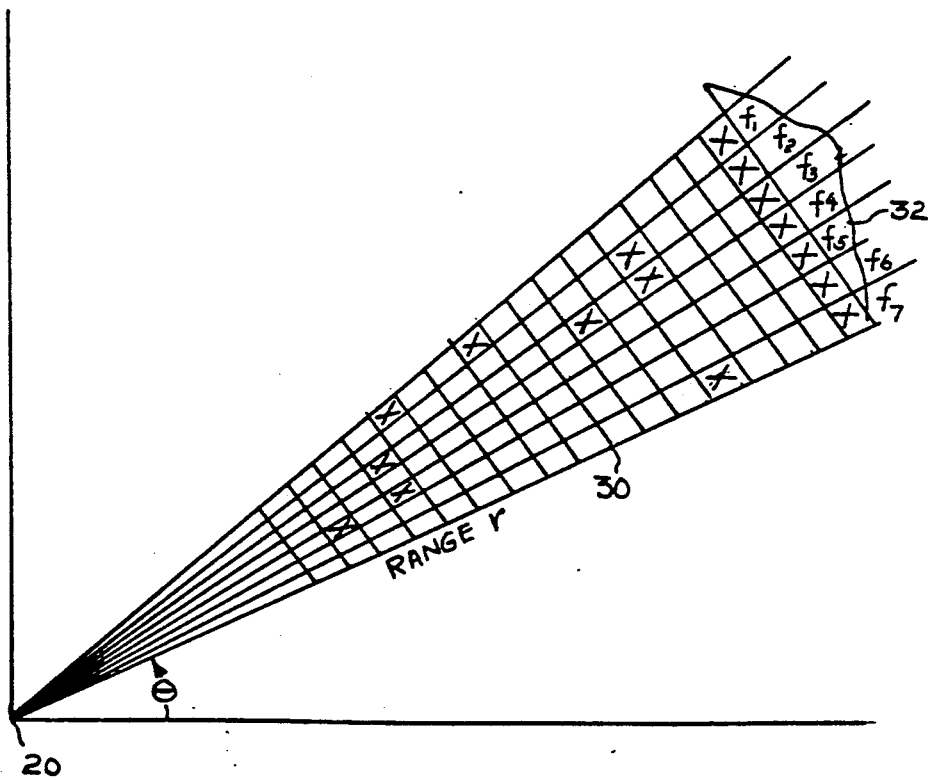
FIG. 3 is a frequency range diagram useful in explaining the detection criteria of the invention.

The detected pulses 28 which satisfy the first amplitude threshold ($T_1$) criteria are counted and compared in number M in a count comparator 29 to a second selected threshold $T_2$ which is a minimum number of pulses 28 which must be detected out of a possible N pulses 24 which could be detected. $T_2$ could, for example, be five in the illustrated case of seven transmitted pulses 24. If the $T_2$ threshold is met, count comparator 29 outputs a second validation signal. Detection of a valid target is satisfied if the number M of binary detected pulses (pulses meeting-the first $T_1$ amplitude threshold) is equal to a greater than the second threshold $T_2$. This two threshold system, commonly referred to as a double thresholder, is effective for ensuring valid target detection of strong reflected signals while being particularly effective in rejecting jamming signals which are typically strong but unlikely to have a frequency match at the minimum number M of all transmitted frequencies $f_1$-$f_7$. It should be observed that while the invention is described in reference to a frequency hopped system, it will also function in single frequency systems frequently used in radar systems in which the sweep angle $\theta$ of each increment of a burst provides a frequency bin grid such as that shown in FIG. 3.

Many circumstances exist where valid target reflected signals are relatively weak signals. A double threshold detector may reject these signals on the M/N threshold criterion. To overcome this deficiency, the present invention provides a third threshold criterion $T_3$ used to adapt the system or method valid detection criteria. This third threshold, $T_3$, is a value that is compared with a summation or integration of the envelope of the detected received signals, ISP.

The circuit to effect this adaptive triple threshold detection is shown at 12 in FIG. 1. The output from receiver/demodulator 16 is, as described above, binary detected by binary detector 26 to output a first validation signal for each pulse exceeding $T_1$. Simultaneously, the demodulated signal from receiver/demodulator 16 is input to an envelope summation or integrating circuit 34 wherein the envelope of the demodulated signal is integrated. The integrated signal is output at 36 as signal ISP. Signal ISP is then simultaneously applied to a pair of amplitude comparators 38, 40. The third threshold value $T_3$ is input to comparator 40 and the value of signal ISP is compared to this signal. If signal ISP equals or exceeds $T_3$ a third validation signal is output at 42. A predetermined multiple $KT_3$ of third threshold $T_3$ is input to comparator 38 and an output generated at 44 if signal ISP is less than $KT_3$ Alternately, a signal is output at 46 if signal ISP exceeds $KT_3$.

The output from count comparator 29 and the ISP $KT_3$ output 46 are applied to an AND gate 48 which generates a valid detection signal at its output 50 when the two conditions that the amplitude of the envelope summation exceeds $KT_3$, and the minimum number M of N possible pulses exceed the pulse count threshold $T_1$, are met. (C) Alternately, if the integrated sum of the receiver/demodulator output ISP exceeds the threshold $T_3$ but is less than the "strong signal" integrated envelope threshold $KT_3$, any detected pulse 28 which exceeds the amplitude threshold $T_1$ is determined to be a valid target detection. This condition is output from output 52 of AND gate 54.

It will thus be seen that the $T_3$ and $KT_3$ thresholds function as a weak signal—strong signal threshold window which adapts the valid target detection criteria on the basis of an integration of the demodulated signal envelope or ISP signal. The system retains full strong signal selectivity with its ability to reject false or jamming signals in a strong reflected signal environment but also adapts its sensitivity when operating in a weak reflected signal environment. It will be observed that strong jamming signals, because of their strength, will normally cause the $KT_3$ threshold to be exceeded by even a single detected jamming signal. For this reason, the ability of the system to detect valid weak signals does not materially affect the systems rejection of jamming signals.

It may be desirable to test the number of pulses satisfying the $T_1$ threshold against a fourth validation threshold $T_4$ which is less than $T_2$ in the weak signal case when $T_3 \leq ISP \leq KT_3$. This can be done by adding a second count comparator 56 which outputs a signal to AND gate 52. $T_4$ can be any number from 1 to any integer value less than $T_2$.

Figure 2:
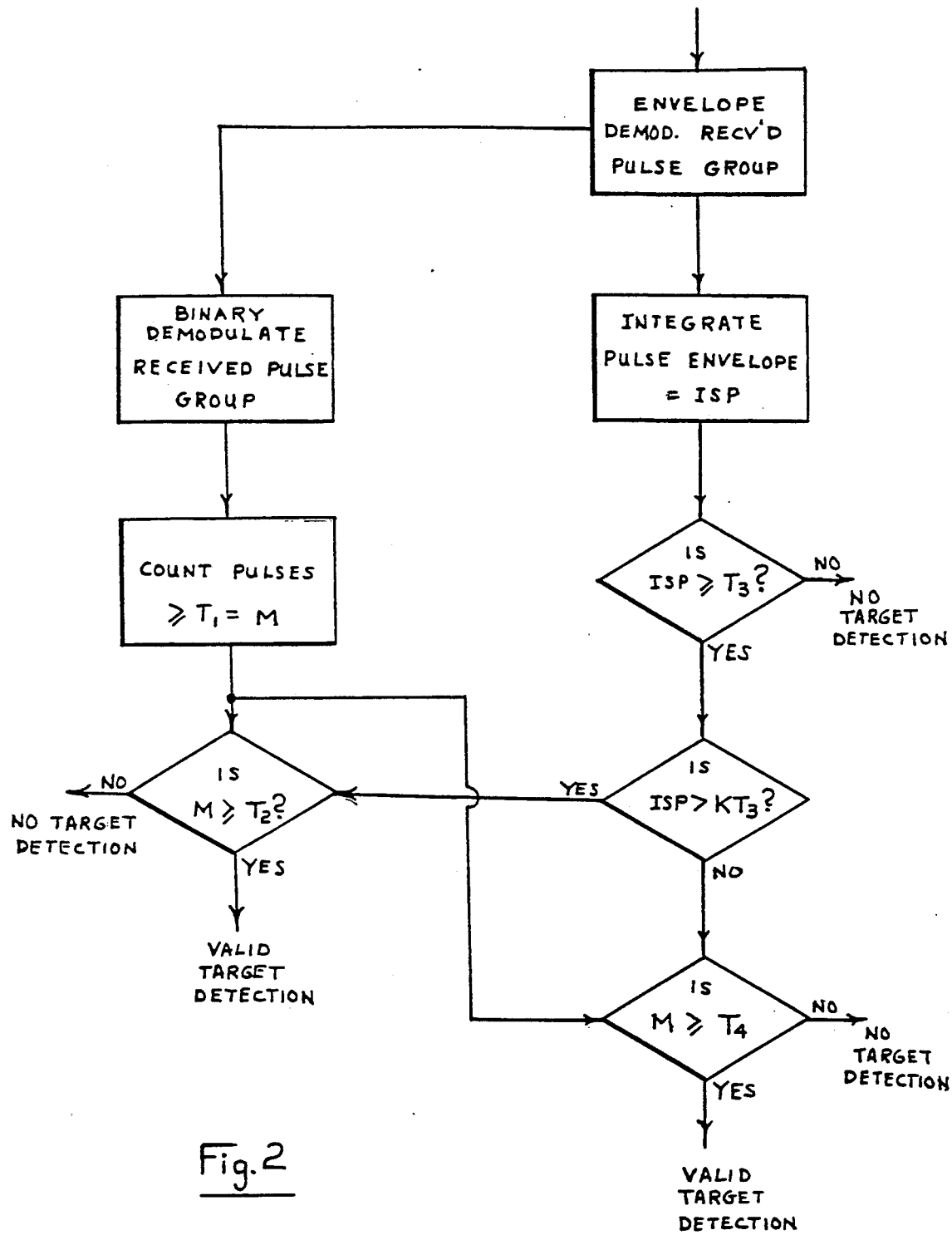
FIG. 2 is a flow chart of the method of the present invention.

Referring to FIG. 2, the method of the invention is shown in flow diagram format. The envelope demodulated signal is first summed to generate signal ISP. The value of ISP is compared to the weak signal threshold $T_3$. If ISP is less than $T_3$, there is no valid signal detection. If ISP is greater than $T_3$, ISP is compared to the strong signal threshold $KT_3$. The envelope demodulated signal is simultaneously binary demodulated and the number of pulses exceeding amplitude threshold $T_1$ is counted. If ISP $\leq T_3$ but $\leq KT_3$ and the count M $\leq T_4$ a valid detection is established. If ISP $KT_3$, and the number of pulses exceeding $T_1$ is at least M of the N transmitted pulses, the $T_2$ threshold is satisfied and a valid detection is indicated. If M $< T_2$ no detection is established.

From the above description, it will now be apparent that the triple thresholder system and method of the present invention provide adaptive threshold criteria which adapts the system to different valid detection criteria, for weak and strong signals. As a consequence, detection of weak valid signals is enhanced while system rejection of false signals in strong reflected signal environments is preserved. Various modifications of the invention will of course be apparent to those skilled in the art without departing from the spirit and scope of the invention. For example, while the invention is described as using a single threshold window which determines the presence of weak signals, it will be apparent that any number of such threshold windows could be employed with different M out of N thresholds being applied for ISP values falling within each of the windows.

What is claimed is:

1. An adaptive pulse signal threshold detector comprising:
   envelope demodulating means for envelope demodulating a received group of pulse signals;
   integrating means connected to receive the envelope demodulated signal for generating a summation signal having a magnitude that is a function of said envelope demodulated signal;
   binary demodulating means connected to receive said envelope demodulated signal for generating a binary pulse in response to each pulse in said group of pulses that exceeds a predetermined amplitude threshold; and
   means for generating a first validation signal and a second validation signal, said first validation signal being generated when said summation signal exceeds a predetermined first summation threshold and is less than a predetermined second summation threshold, said second validation signal being generated when said summation signal exceeds said predetermined second summation threshold and the number of binary pulses that exceeds said predetermined amplitude threshold also exceeds a first predetermined threshold number.

2. The adaptive threshold detector of claim 1 wherein said group of pulses include a sequence of pulses each of a different frequency.

3. The adaptive threshold detector of claim 2 wherein said groups of pulses are reflected signals and further including means of determining the reflected range of said pulses, the pulses of a said group being of equal range.

4. The adaptive threshold detector of claim 3 wherein said second summation threshold is a predetermined multiple of said first summation threshold.

5. The adaptive threshold detector of claim 3 wherein said reflected signals are sonar signals.

6. The adaptive threshold detector of claim 3 wherein said reflected signals are radar signals.

7. The adaptive threshold detector of claim 5 wherein said second pulse count threshold is less than said first pulse count threshold.

8. The adaptive pulse signal threshold detector comprising:
   envelope demodulating means for envelope demodulating a received group of pulse signals;
   integrating means connected to receive the envelope demodulated signal for generating a summation signal having a magnitude that is a function of said envelope demodulated signal;
   binary demodulating means connected to receive said envelope demodulated signal for generating a binary pulse in response to each pulse in said group of pulses that exceeds a predetermined amplitude threshold; and
   means for generating a first validation signal and a second validation signal, said first validation signal being generated when said summation signal exceeds a predetermined first summation threshold and is less than a predetermined second summation threshold and the number of binary pulses that exceeds said predetermined amplitude threshold also exceeds a first predetermined threshold number, said second validation signal being generated when said summation signal exceeds said predetermined second summation threshold and the number of binary pulses that exceeds said predetermined amplitude threshold also exceeds a second predetermined threshold number, said second predetermined threshold number being less than said first predetermined threshold number.

9. The adaptive threshold detector of claim 8 wherein said means for generating includes:
   (a) first comparator means for comparing said summation signal with said first summation threshold and providing a first output signal when said summation signal is greater than said first summation threshold;
   (b) second comparator means for comparing said summation signal with said second summation threshold and providing a second output signal when said summation signal is greater than said second summation threshold and providing a third output signal when said second summation threshold is less than said second summation threshold signal; and
   (c) first logic means coupled to receive said first and second output signals for providing said first validation signal.

10. The adaptive threshold detector of claim 9 wherein said means for generating further includes:
   (a) third comparator means for comparing the number of said binary pulses with said first predetermined threshold number and producing a third output signal when said number of binary pulses equals or exceeds said first predetermined threshold number;
   (b) second logic means coupled to receive said third and fourth output signals for providing said second validation signal.

11. The adaptive threshold detector of claim 10 wherein said means for generating further includes:

(b) fourth comparator means for comparing the number of said binary pulses with said second predetermined threshold number and producing a fifth output signal when said number of binary pulses equals or exceeds said second predetermined threshold number, said fifth output signal being coupled to said first logic means.

12. The adaptive threshold detector of claim 1 wherein said means for generating includes:
(a) first comparator means for comparing said summation signal with said first summation threshold and providing a first output signal when said summation signal is greater than said first summation threshold;
(b) second comparator means for comparing said summation signal with said second summation threshold and providing a second output signal when said summation signal is greater than said second summation threshold and providing a third output signal when said second summation threshold is less than said second summation threshold signal; and
(c) first logic means coupled to receive said first and second output signals for providing said first validation signal.

13. The adaptive threshold detector of claim 12 wherein said means for generating further includes:
(a) third comparator means for comparing the number of said binary pulses with said first predetermined threshold number and producing a third output signal when said number of binary pulses equals or exceeds said first predetermined threshold number;
(b) second logic means coupled to receive said third and fourth output signals for providing said second validation signal.

14. A method for adaptively detecting a pulse signal comprising:
envelope demodulating a received group of pulse signals;
integrating the envelope demodulated signal for generating a summation signal having a magnitude that is a function of said envelope demodulated signal;
binary demodulating said envelope demodulated signal to generate a binary pulse in response to each pulse in said group of pulses that exceeds a predetermined amplitude threshold; and
generating a first validation signal and a second validation signal, said first validation signal being generated when said summation signal exceeds a predetermined first summation threshold and is less than a predetermined second summation threshold and the number of binary pulses that exceeds said predetermined amplitude threshold also exceeds a first predetermined threshold number, said second validation signal being generated when said summation signal exceeds said predetermined second summation threshold and the number of binary pulses that exceeds said predetermined amplitude threshold also exceeds a first predetermined threshold number, said predetermined threshold number being less than said first predetermined threshold number.

15. A method for adaptively detecting a pulse signal comprising:
envelope demodulating a received group of pulse signals;
integrating the envelope demodulated signal for generating a summation signal having a magnitude that is a function of said envelope demodulated signal;
binary demodulating said envelope demodulated signal to generate a binary pulse in response to each pulse in said group of pulses that exceeds a predetermined amplitude threshold; and
generating a first validation signal and a second validation signal, said first validation signal being generated when said summation signal exceeds a predetermined first summation threshold is less than a predetermined second summation threshold and the number of binary pulses that exceeds said predetermined amplitude threshold also exceeds a first predetermined threshold number, said second validation signal being generated when said summation signal exceeds said predetermined second summation threshold and the number of binary pulses that exceeds said predetermined amplitude threshold also exceeds a first predetermined threshold number, said predetermined threshold number being less than said first predetermined threshold number.

* * * * *